(12) United States Patent
Choi

(10) Patent No.: US 8,189,777 B2
(45) Date of Patent: May 29, 2012

(54) APPARATUS AND METHOD FOR DRIVING DISPLAY PANEL

(75) Inventor: Yong-Seok Choi, Chungcheongbuk-do (KR)

(73) Assignee: MagnaChip Semiconductor, Ltd., Chungcheongbuk-do (KR)

( * ) Notice: Subject to any disclaimer, the term of this patent is extended or adjusted under 35 U.S.C. 154(b) by 1207 days.

(21) Appl. No.: 11/984,385

(22) Filed: Nov. 16, 2007

(65) Prior Publication Data

US 2008/0123860 A1 May 29, 2008

(30) Foreign Application Priority Data

Nov. 24, 2006 (KR) ........................ 10-2006-0117060

(51) Int. Cl.
*H04L 29/06* (2006.01)
(52) U.S. Cl. .......................................... 380/44; 382/190
(58) Field of Classification Search .................... 380/44, 380/278; 382/166, 190
See application file for complete search history.

(56) References Cited

U.S. PATENT DOCUMENTS

| | | | | |
|---|---|---|---|---|
| 5,870,130 | A * | 2/1999 | Bae | 347/183 |
| 7,266,245 | B1 * | 9/2007 | Lin | 382/232 |
| 7,724,265 | B2 | 5/2010 | Takada et al. | |
| 7,860,323 | B2 * | 12/2010 | Kim et al. | 382/232 |
| 2002/0083324 | A1 * | 6/2002 | Hirai | 713/176 |
| 2004/0247032 | A1 * | 12/2004 | Aihara et al. | 375/240.16 |
| 2005/0140619 | A1 | 6/2005 | Hong | |
| 2007/0091115 | A1 | 4/2007 | Takada | |

FOREIGN PATENT DOCUMENTS

| | | |
|---|---|---|
| JP | 2005181402 A | 7/2005 |
| JP | 2007108439 A | 4/2007 |
| KR | 10-2005-0058048 | 6/2005 |
| KR | 10-2005-0058054 | 6/2005 |
| KR | 10-2006-0037502 | 5/2006 |
| KR | 2006-36953 | 5/2006 |
| KR | 10-0590923 B1 | 6/2006 |

OTHER PUBLICATIONS

Japanese Office Action dated Dec. 13, 2011 in counterpart JP patent application.

* cited by examiner

*Primary Examiner* — Hadi Armouche
(74) *Attorney, Agent, or Firm* — Morgan, Lewis & Bockius LLP

(57) ABSTRACT

A display panel driver includes: an encryption unit configured to receive pixel data of unit pixels from an image data source, generate an encryption key by comparing an odd-numbered pixel data with a subsequent even-numbered pixel data, and assign a reference value corresponding to the encryption key; and a decryption unit configured to receive the encryption key and the reference value, compare the encryption key with a decryption key, and restore the odd-numbered pixel data and the even-numbered pixel data by using the reference value according to the comparison result.

23 Claims, 6 Drawing Sheets

FIG. 6A

| ENCRYPTION KEY (ENK) (3 BITS) | REFERENCE VALUE (VREF) (6 BITS) |
|---|---|
| 000 | (2N-1)-th PIXEL DATA |

FIG. 6B

| ENCRYPTION KEY (ENK) (3 BITS) | REFERENCE VALUE (VREF) (6 BITS) |
|---|---|
| 001 | (2N-1)-th PIXEL DATA |

FIG. 6C

| ENCRYPTION KEY (ENK) (3 BITS) | REFERENCE VALUE (VREF) (6 BITS) |
|---|---|
| 010 | (2N-1)-th PIXEL DATA |

FIG. 6D

| ENCRYPTION KEY (ENK) (1 BITS) | REFERENCE VALUE (VREF) (8 BITS) | |
|---|---|---|
| 1 | UPPER 4 BITS OF (2N-1)-th PIXEL DATA | UPPER 4 BITS OF 2N-th PIXEL DATA |

FIG. 7A

| DECRYPTION KEY (3 BITS) | (2N-1)-th PIXEL DATA (6 BITS) | 2N-th PIXEL DATA (6 BITS) |
|---|---|---|
| 000 | REFERENCE VALUE | REFERENCE VALUE |

FIG. 7B

| DECRYPTION KEY (3 BITS) | (2N-1)-th PIXEL DATA (6 BITS) | 2N-th PIXEL DATA (6 BITS) |
|---|---|---|
| 001 | REFERENCE VALUE | REFERENCE VALUE + OFFSET |

FIG. 7C

| DECRYPTION KEY (3 BITS) | (2N-1)-th PIXEL DATA (6 BITS) | 2N-th PIXEL DATA (6 BITS) |
|---|---|---|
| 010 | REFERENCE VALUE | REFERENCE VALUE - OFFSET |

FIG. 7D

| DECRYPTION KEY (1 BITS) | (2N-1)-th PIXEL DATA (6 BITS) | 2N-th PIXEL DATA (6 BITS) |
|---|---|---|
| 1 | SIX BITS USING UPPER FOUR BITS OF REFERENCE VALUE AND UPPER TWO BITS OF UPPER 4 BITS | SIX BITS USING LOWER FOUR BITS OF REFERENCE VALUE AND UPPER TWO BITS OF LOWER FOUR BITS |

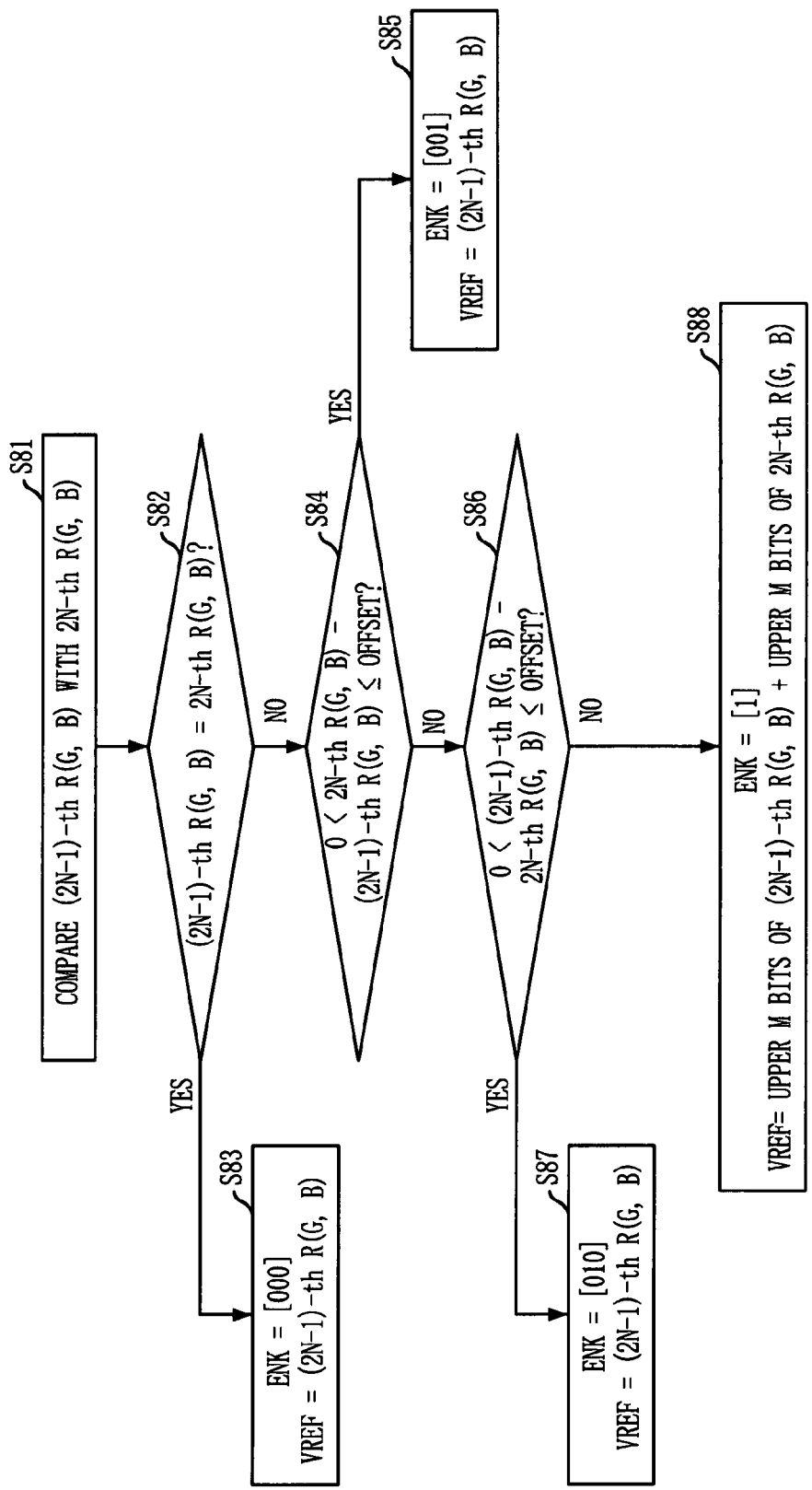

APPARATUS AND METHOD FOR DRIVING DISPLAY PANEL

CROSS-REFERENCE TO RELATED APPLICATIONS

The present invention claims priority of Korean patent application number 10-2006-0117060, filed on Nov. 24, 2006, which is incorporated by reference in its entirety.

BACKGROUND OF THE INVENTION

The present invention relates to an image processor, and more particularly, to an apparatus and a method for driving a display panel, which can compress and decompress an image data to be displayed on the display panel.

In conjunction with advances in semiconductor and communication technologies, light and slim image display devices having high resolution are being developed. Examples of image display devices include a liquid crystal display (LCD), a field emission display (FED), a plasma display panel (PDP), and an electro-luminescence device (ELD).

Generally, an image display device includes a display panel and a display panel driver. The display panel driver stores digital image data received from an image source and converts the digital image data into analog signals.

FIG. 1 is a block diagram of a conventional image display device.

Referring to FIG. 1, the conventional image display device includes a display panel 140 and a display panel driver 100. The display panel driver 100 includes an RGB interface 110, a memory 120, and a digital to analog (D/A) converter 130. The RGB interface 110 receives and transfers digital image data of RGB unit pixels, which are supplied an image source. The memory 120 stores the image data without compression or conversion. The D/A converter 130 converts the image data stored in the memory 120 into analog signals and outputs the converted analog signals to the display panel 140.

However, because the image data supplied from the image source is stored in the memory 120 through the RGB interface 110 without compression or conversion, the conventional display panel driver 100 has a problem in that the capacity of the memory 120 must be at least large enough to process the number of bits in the image data. For this reason, when a test of the memory is conducted, the test will take an extensive amount of time to complete.

SUMMARY OF THE INVENTION

Embodiments of the present invention are directed to providing an apparatus and method for driving a display panel, which are capable of preventing reduction in image data resolution while decreasing the memory capacity needed to store the image data.

In accordance with an aspect of the present invention, there is provided a display panel driver, including: an encryption unit configured to receive pixel data of unit pixels from an image data source, generate an encryption key by comparing an odd-numbered pixel data with a subsequent even-numbered pixel data, and assign a reference value corresponding to the encryption key; and a decryption unit configured to receive the encryption key and the reference value, compare the encryption key with a decryption key, and restore the odd-numbered pixel data and the even-numbered pixel data by using the reference value according to the comparison result.

In accordance with another aspect of the present invention, there is provided a method for driving a display panel, including: receiving pixel data of unit pixels from an image data source, generating an encryption key by comparing an odd-numbered pixel data with a subsequent even-numbered pixel data, and assigning a reference value corresponding to the encryption key, thereby compressing the pixel data of the pixels; and comparing the encryption key with a decryption key, and restoring the odd-numbered pixel data and the even-numbered pixel data by using the reference value according to the comparison result.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIGS. 6A-6D are diagrams showing data frames including encryption keys and reference values used in accordance with an embodiment of the present invention.

FIGS. 7A-7D are diagrams showing data frames including decryption keys used in accordance with an embodiment of the present invention.

FIG. 8 is a flowchart showing a compression method in accordance with an embodiment of the present invention.

DESCRIPTION OF SPECIFIC EMBODIMENTS

Hereinafter, an apparatus and method for driving a display panel in accordance with the present invention will be described in detail with reference to the accompanying drawings.

Figure 2:
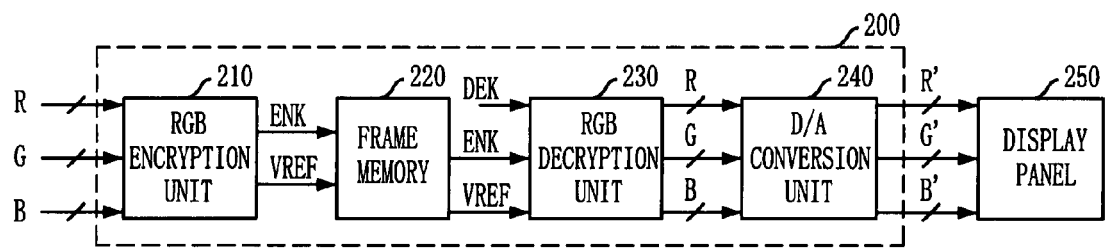
FIG. 2 is a block diagram of an image display device in accordance with an embodiment of the present invention.

FIG. 2 is a block diagram of an image display device in accordance with an embodiment of the present invention. In the following description, "N" refers to natural numbers.

Referring to FIG. 2, the image display device in accordance with embodiments of the present invention includes a display panel driver 200 and a display panel 250. The display panel driver 200 includes an RGB encryption unit 210, a frame memory 220, an RGB decryption unit 230, and a D/A conversion unit 240.

The RGB encryption unit 210 receives digital pixel data of RGB unit pixels from an image data source, compares an odd-numbered (2N−1)-th unit pixel data with a subsequent even-numbered 2N-th unit pixel, and assigns an encryption key ENK and a reference value VREF. The frame memory 220 stores the encryption key ENK and the reference value VREF. The RGB decryption unit 230 receives the encryption key ENK and the reference value VREF from the frame memory 220, compares the received encryption key ENK with a decryption key DEK, and uses the reference value VREF to decrypt the pixel data of the unit pixels according to the comparison result. The D/A conversion unit 240 converts the decrypted pixel data into analog signals, which is to be displayed on the display panel 250.

Figure 3:
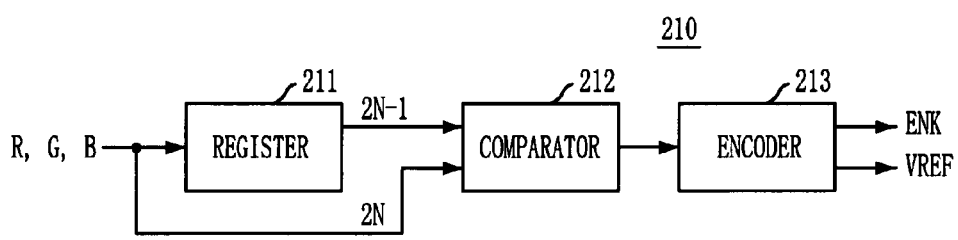
FIG. 3 is a block diagram of an RGB encryption unit in FIG. 2.

FIG. 3 is a block diagram of the RGB encryption unit 210 in FIG. 2.

Referring to FIG. 3, the RGB encryption unit 210 includes a plurality of registers 211 for buffer memory, a plurality of comparators 212, and a plurality of encoders 213. The registers 211 temporarily store pixel data of odd-numbered unit pixels (hereinafter, referred to as (2N−1)-th pixels). The comparators 212 compare the data of the (2N−1)-th pixels, which are stored in the registers 211, with data of even-numbered unit pixels (hereinafter, referred to as 2N-th pixels), which are directly supplied from the image data source. The encoders 213 assign the encryption key ENK and the reference value VREF as a common pixel data of two unit pixels to compress two pixel data into one reference value VREF.

Figure 4:
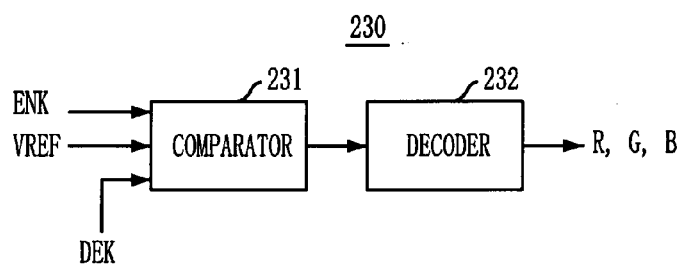
FIG. 4 is a block diagram of an RGB decryption unit in FIG. 2.

FIG. 4 is a block diagram of the RGB decryption unit 230 in FIG. 2.

Referring to FIG. 4, the RGB decryption unit 230 includes a plurality of comparators 231 and a plurality of decoders 232. The comparators 231 receive the encryption key ENK and the reference value VREF, which are inputted from the encoder 213 of the RGB encryption unit 210 and stored in the frame memory 220, and compare the encryption key ENK with the decryption key DEK. The decoders 232 decode the compressed pixel data into two pixel data using the reference value VREF according to the comparison result of the comparators 231.

Figure 1:
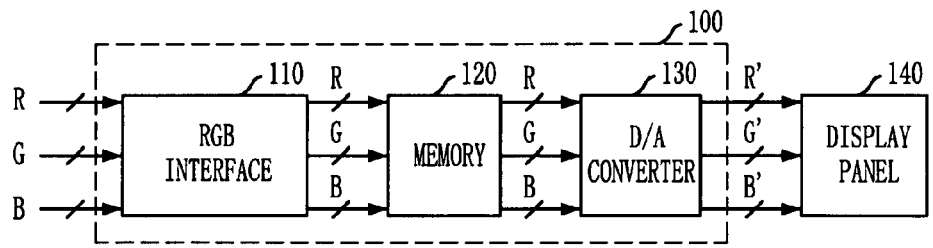
FIG. 1 is a block diagram of a conventional image display device.

A compression and decompression method of the display panel driver illustrated in FIGS. 1 and 2 will be described below with reference to FIGS. 5 to 9.

Figure 5:
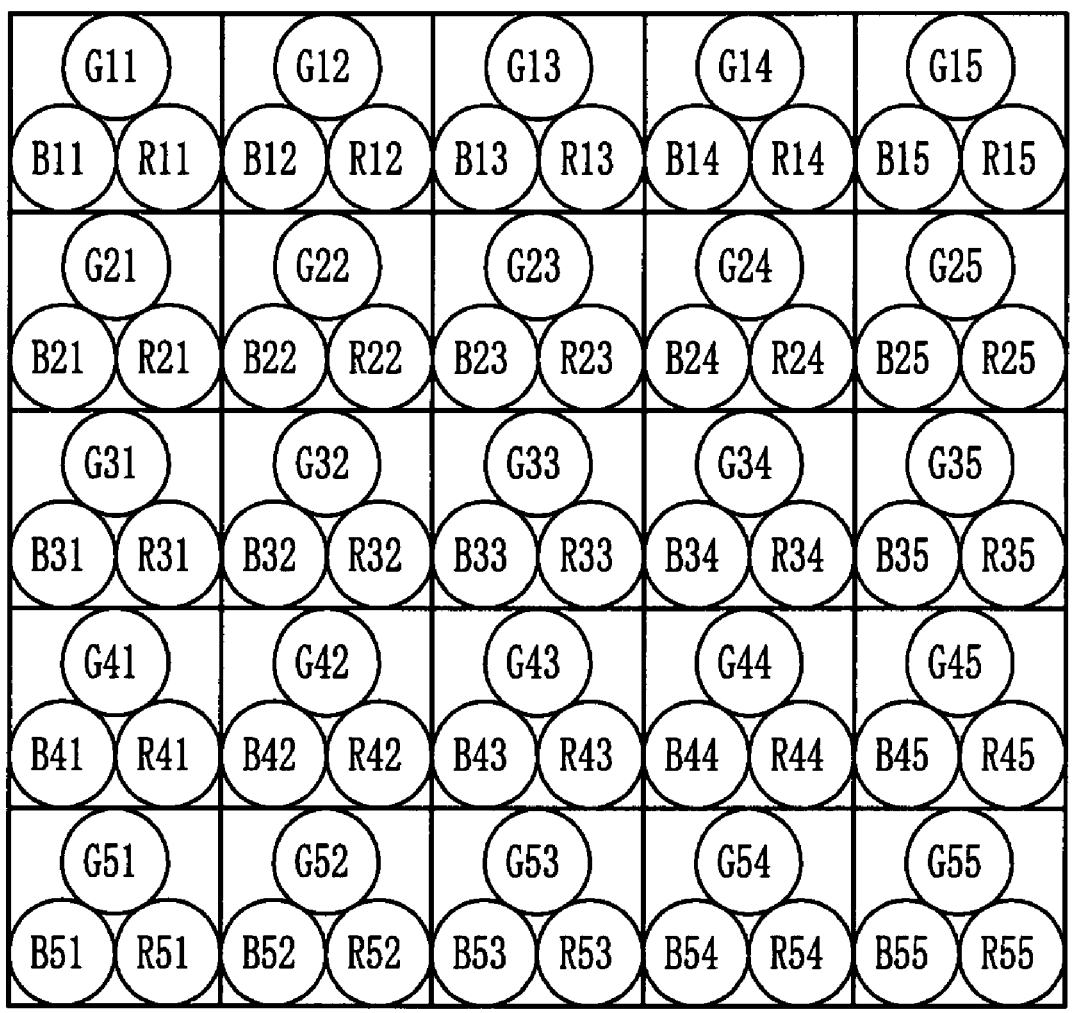
FIG. 5 is a diagram of a pixel pattern having a 5×5 pixel kernel.
Figure 9:
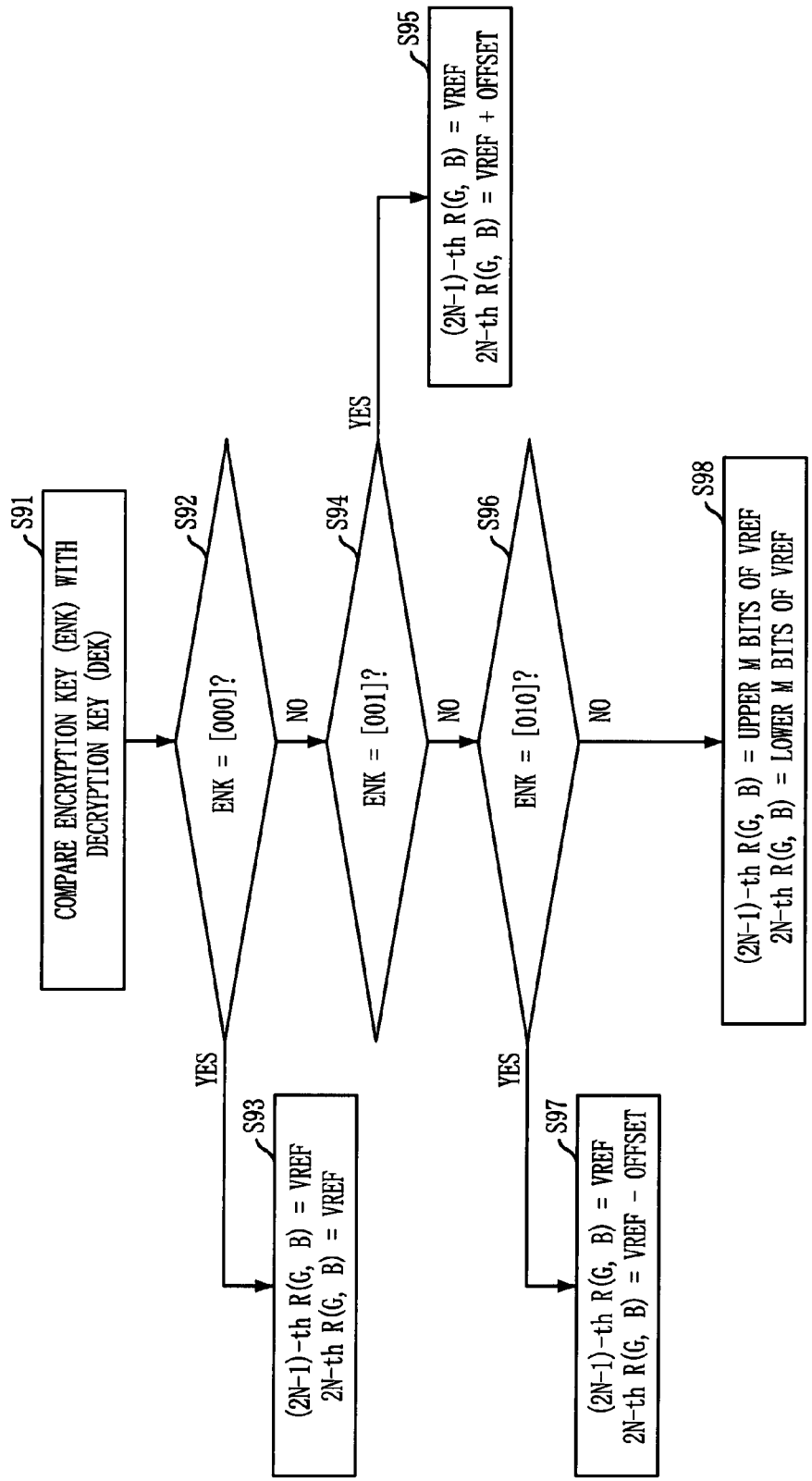
FIG. 9 is a flowchart showing a decompression method in accordance with an embodiment of the present invention.

FIG. 5 is a diagram of a pixel pattern having a 5×5 pixel kernel, and FIGS. 6A-6D are diagrams showing data frames including the encryption key ENK and the reference values VREF used in accordance with an embodiment of the present invention. FIGS. 7A-7D are diagrams showing data frames including the decryption key DEK used in accordance with an embodiment of the present invention. FIG. 8 is a flowchart showing a compression method in accordance with an embodiment of the present invention, and FIG. 9 is a flowchart showing a decompression method in accordance with an embodiment of the present invention.

For the sake of convenience, the following description will be focused on green (G) pixels.

Hereinafter, the compression method is described in detail referring to FIGS. 2 to 6A-6D, and 8.

A pixel data of a (2N−1)-th pixel G11 is received from the image data source and temporarily stored in the register 211. When a 2N-th pixel G12 is inputted from the image data source, the comparator 212 compares the pixel data of the pixel G11, which is stored in the register 211, with the pixel data of the pixel G12, which is directly inputted from the image data source (S81).

When the pixel data of the pixel G11 is identical to that of the pixel data of the pixel G12 in step S81, the encoder 213 generates the encryption key ENK and assigns the pixel data value of the pixel G11 as a reference value VREF (S82, S83), as illustrated in FIG. 6A. On the other hand, as illustrated in FIG. 6B, the encoder 213 generates the encryption key ENK and assigns the pixel data value of the pixel G11 as the reference value when the pixel data of the pixel G11 is different from that of the pixel G12 and the value calculated by subtracting the pixel data of the pixel G11 from the pixel data of the pixel G12 is greater than zero and equal to or less than an offset value, which is a code value of 1 or 2 set by a user (S84, S85). When the value calculated by subtracting the pixel data of the pixel G12 from the pixel data of the pixel G11 is greater than zero and equal to or less than the offset value, the encoder 213 generates the encryption key ENK and assigns the pixel data value of the pixel G11 as the reference value VREF (S86, S87), as illustrated in FIG. 6C. When the above-described conditions are not met, the encoder 213 generates the encryption code ENK, assigns an upper bit of the pixel data value of the pixel G11 as an upper bit of the reference value VREF, and assigns an upper bit of the pixel data value of the pixel G12 as a lower bit of the reference value VREF (S88), as illustrated in FIG. 6D.

It will be assumed that the pixel data value is expressed as a code of 1-64 ($2^0$-$2^6$).

When the pixel data value of the pixel G11 is "100100" and the pixel data value of the pixel G12 is "100100", the encoder 213 generates "000" as the encryption key ENK, assigns "100100" (which is the pixel data value of the pixel G11) as the reference value VREF, and stores it in the frame memory 220. On the other hand, when the pixel data value of the pixel G11 is "100100" and the pixel data value of the pixel G12 is "100101" (It is assumed that the offset value is "1" ("000001" in binary number)), the encoder 213 generates "001" as the encryption code ENK and assigns "100100" (which is the pixel data value of the pixel G11) as the reference value VREF. When the pixel data value of the pixel G11 is "100100" and the pixel data value of the pixel G12 is "100011", the encoder 213 generates "010" as the encryption key ENK and assigns "100100" (which is the pixel data value of the pixel G11) as the reference value VREF. When the pixel data value of the pixel G11 is "100100" and the pixel data value of the pixel G12 is "110000", the encoder 213 generates "1" as the encryption code ENK because the pixel data value of the pixel G11 is not equal to a sum or difference of the pixel data value of the pixel G12 and the offset value. In addition, the encoder 213 assigns "1001", which is upper four bits of the pixel data value of the pixel G11, as upper four bits of the reference value VREF, and assigns "1100", which is upper four bits of the pixel data value of the pixel G12, as lower four bits of the reference value VREF. Consequently, the reference value VREF becomes "10011100".

Hereinafter, the compression method is described in detail referring to FIGS. 2 to 5, 7A-7D and 9.

The comparator 231 receives the encryption key ENK and the reference value VREF, which are generated through the RGB encryption unit 210 and stored in the frame memory 220, and the decryption key DEK, and compares the encryption key ENK with the decryption key DEK (S91).

When the encryption key ENK is "000", the decoder 232 restores the pixel data value of the pixel G11 and the pixel data value of the pixel G12 using the reference value VREF (S92, S93), as illustrated in FIG. 7A. On the other hand, when the encryption key ENK is "001", the decoder 232 restores the pixel data value of the pixel G11 using the reference value VREF and restores the pixel data value of the pixel G12 using a value calculated by adding the reference value VREF to the offset value (S94, S95), as illustrated in FIG. 7B. When the encryption key is "010", the decoder 232 restores the pixel data value of the pixel G11 using the reference value VREF and restores the pixel data value of the pixel G12 using a value calculated by subtracting the offset value from the reference value VREF (S96, S97), as illustrated in FIG. 7C. When the encryption key is "1", the decoder 232 restores the upper four bits of the pixel data value of the pixel G11 using the upper four bits of the reference value VREF and restores the remaining lower two bits using most significant bit (MSB) of the decoded upper four bits and its next bit, as illustrated in FIG.

7D. The decoder 232 restores the upper four bits of the pixel data value of the pixel G12 using the lower four bits of the reference value VREF and restores the remaining lower two bits using MSB of the decoded upper four bits and its next bit (S98).

The following description will be given for a 6-bit reference value VREF of "100100" where the encryption key ENK is "000", "001" and "010", and an 8-bit reference value VREF of "10011001" where the encryption key ENK is "1".

When the encryption key ENK is "000", the decoder 232 restores the pixel data value of the pixel G11 and the pixel data value of the pixel G12 into "100100". When the encryption key ENK is "001", the decoder 232 restores the pixel data value of the pixel G11 into "100100" and restores the pixel data value of the pixel G12 into "100101", which is "100100 (reference value)+000001 (offset value)". When the encryption key ENK is "010", the decoder 232 restores the pixel data value of the pixel G11 into "100100" and restores the pixel data value of the pixel G12 into "100011", which is "100100 (reference value)−000001 (offset value)". When the encryption key ENK is "1", the decoder 232 restores the pixel data value of the pixel G11 into "100110" and restores the pixel data value of the pixel G12 into "100110".

While the compression and decompression methods have been given for the green pixels G11 and G12, they can also be applied to red pixels and blue pixels. At this point, the compression is performed by pairing two neighboring pixels. That is, pixels that have already been compressed are omitted from the next pixel's pixel data compression, and two newly selected pixels are compressed as a pair.

In the compressing process, when the encryption key ENK is "1" as illustrated in FIG. 6D, the reference value VREF is assigned 8 bits, that is, the upper four bits of the odd pixel data and the upper four bits of th even pixel data. However, the reference value VREF can also be assigned ten bits, that is, five upper bits of the odd pixel data and the five upper bits of the even pixel data. In this case, the range of errors arising from the decompression of the lower two bits can be reduced to one bit.

As described above, the pixel data supplied from the image data source is compressed and stored in the memory, and the compressed data stored in the memory is restored to its original pixel data, thereby minimizing loss in resolution and reducing the amount of memory required to store the pixel data by approximately 25%.

Further, by compressing pixel data and reducing required memory capacity, the chip size of the display panel driver can be reduced, defects in random access memories (RAM) used as frame memories can be reduced, thereby increasing product yield.

In embodiments in accordance with the present invention, "RGB" has been exemplarily described; however, the embodiments may be applied to "YUV" or "YCBCR". Thus, the present invention can be applied to display panel drivers supporting a diverse range of input formats.

While the present invention has been described with respect to the specific embodiments, it will be apparent to those skilled in the art that various changes and modifications may be made without departing from the spirit and scope of the invention as defined in the following claims.

What is claimed is:

1. A display panel driver, comprising:
    an encryption unit configured to receive pixel data of unit pixels from an image data source, generate an encryption key by comparing an odd-numbered pixel data with a subsequent even-numbered pixel data, and assign a reference value corresponding to the encryption key;
    a storage unit configured to store the encryption key and the reference value outputted from the encryption unit; and
    a decryption unit configured to receive the encryption key and the reference value, compare the encryption key with a decryption key, and restore the odd-numbered pixel data and the even-numbered pixel data by using the reference value according to the comparison result.

2. The display panel driver as recited in claim 1, further comprising a digital to analog converter configured to convert the pixel data, which is outputted from the decryption unit in a digital signal format, into an analog signal.

3. The display panel driver as recited in claim 1, wherein the encryption unit comprises:
    a buffer memory configured to temporarily store the odd-numbered pixel data;
    a first comparator configured to compare the odd-numbered pixel data, which is stored in the buffer memory, with the even-numbered pixel data, which is supplied from the image data source; and
    an encoder configured to generate the encryption key and the reference value according to the comparison result of the first comparator.

4. The display panel driver as recited in claim 3, wherein the encoder generates the encryption key having a first value and assigns the odd-numbered pixel data as the reference value when a value of the odd-numbered pixel data is equal to that of the even-numbered pixel data;
    the encoder generates the encryption key having a second value and assigns the odd-numbered pixel data as the reference value when a value calculated by subtracting the odd-numbered pixel data from the even-numbered pixel data is greater than zero and equal to or less than an offset value;
    the encoder generates the encryption key having a third value and assigns the odd-numbered pixel data as the reference value when a value calculated by subtracting the pixel data of the even-numbered pixel data from the odd-numbered pixel data is greater than zero and equal to or less than the offset value; and
    the encoder generates the encryption key having a fourth value and assigns upper bits of the odd-numbered pixel data as upper bits of the reference value and assigns upper bits of the even-numbered pixel data as lower bits of the reference value when a difference of the odd-numbered pixel data and the even-numbered pixel data is greater than the offset value.

5. The display panel driver as recited in claim 4, wherein the decryption unit comprises:
    a second comparator configured to compare the encryption keys having the first to fourth values with the decryption key; and
    a decoder configured to restore the odd-numbered pixel data and the even-numbered pixel data by using the reference value corresponding to the decryption key according to the comparison result of the second comparator.

6. The display panel driver as recited in claim 5, wherein the decoder restores the odd-numbered pixel data and the even-numbered pixel data into the same value as the reference value, when the encryption key having the first value is equal to the decryption key;
    the decoder restores the odd-numbered pixel data into the same value as the reference value and restores the even-numbered pixel data into the value calculated by adding the reference value to the offset value, when the encryption key having the second value is equal to the decryption key;

the decoder restores the odd-numbered pixel data and restores the even-numbered pixel data into the value calculated by subtracting the offset value from the reference value, when the encryption key having the third value is equal to the decryption key; and the decoder restores the upper bits of the odd-numbered pixel data into upper bits of the reference value and restores the upper bits of the even-numbered pixel data into the remaining lower bits of the reference value.

7. The display panel driver as recited in claim 6, wherein the remaining lower bits excluding the upper bits of the odd-numbered pixel data are restored with a most significant bit (MSB) of the upper bits of the odd-numbered pixel data and a subsequent bit.

8. The display panel driver as recited in claim 6, wherein the remaining lower bits excluding the upper bits of the even pixel are restored with an MSB of the upper bits of the even pixel and a subsequent bit.

9. A method for driving a display panel, comprising:
receiving pixel data of unit pixels from an image data source, generating an encryption key by comparing an odd-numbered pixel data with a subsequent even-numbered pixel data, and assigning a reference value corresponding to the encryption key, thereby compressing the pixel data of the pixels; and comparing the encryption key with a decryption key, and restoring the odd-numbered pixel data and the even-numbered pixel data by using the reference value according to the comparison result.

10. The method as recited in claim 9, further comprising:
storing the encryption key and the reference value; and
converting the pixel data into analog signals.

11. The method as recited in claim 9, wherein the compressing of the pixel data comprises:
temporarily storing the odd-numbered pixel data;
comparing the odd-numbered pixel data with the even-numbered pixel data, which is supplied from the image data source; and
generating the encryption key and the reference value according to the comparison result.

12. The method as recited in claim 11, wherein the generating of the encryption key and the reference value comprises:
generating the encryption key having a first value and assigning the odd-numbered pixel data as the reference value when a value of the odd-numbered pixel data is equal to that of the even-numbered pixel data.

13. The method as recited in claim 12, wherein the generating of the encryption key and the reference value comprises:
generating the encryption key having a second value and assigning the odd-numbered pixel data as the reference value when a value calculated by subtracting the odd-numbered pixel data from the even-numbered pixel data is greater than zero and equal to or less than an offset value.

14. The method as recited in claim 13, wherein the generating of the encryption key and the reference value comprises:
generating the encryption key having a third value and assigning the odd-numbered pixel data as the reference value when a value calculated by subtracting the even-numbered pixel data from the odd-numbered pixel data is greater than zero and equal to or less than the offset value.

15. The method as recited in claim 14, wherein the generating of the encryption key and the reference value comprises:
generating the encryption key having a fourth value, assigning upper bits of the odd-numbered pixel data as upper bits of the reference value, and assigning upper bits of the even-numbered pixel data as lower bits of the reference value when a difference of the odd-numbered pixel data and the even-numbered pixel data is greater than the offset value.

16. The method as recited in claim 15, wherein the restoring of the odd-numbered pixel data and the even-numbered pixel data comprises:
comparing the encryption keys having the first to fourth values with the decryption key; and
restoring the odd-numbered pixel data and the even-numbered pixel data by using the reference value corresponding to the decryption key according to the comparison result.

17. The method as recited in claim 16, wherein the restoring of the odd-numbered pixel data and the even-numbered pixel data comprises:
restoring the odd-numbered pixel data and the even-numbered pixel data into the same value as the reference value when the encryption key having the first value is equal to the decryption key.

18. The method as recited in claim 17, wherein the restoring of the odd-numbered pixel data and the even-numbered pixel data comprises:
restoring the odd-numbered pixel data into the same value as the reference value and restores the even-numbered pixel data into a value calculated by adding the reference value to the offset value when the encryption key having the second value is equal to the decryption key.

19. The method as recited in claim 18, wherein the restoring of the odd-numbered pixel data and the even-numbered pixel data comprises:
restoring the odd-numbered pixel data and restores the even-numbered pixel data into a value calculated by subtracting the offset value from the reference value when the encryption key having the third value is equal to the decryption key.

20. The method as recited in claim 19, wherein the restoring of the odd-numbered pixel data and the even-numbered pixel data comprises:
restoring the upper bits of the odd-numbered pixel data into upper bits of the reference value and restores the upper bits of the even-numbered pixel data into the remaining lower bits of the reference value.

21. The method as recited in claim 20, wherein the remaining lower bits excluding the upper bits of the odd-numbered pixel data are restored with an MSB of the upper bits of the odd-numbered pixel data and a subsequent bit.

22. The method as recited in claim 20, wherein the remaining lower bits excluding the upper bits of the even pixel are restored with an MSB of the upper bits of the even pixel and a subsequent bit.

23. The method as recited in claim 9, wherein the pixel data is represented in an RGB format, a YUV format, or a YCbCr format.

* * * * *